(12) United States Patent
Schuldt et al.

(10) Patent No.: US 10,876,269 B2
(45) Date of Patent: Dec. 29, 2020

(54) FOUNDATION FOR A WINDMILL

(71) Applicant: HOLCIM TECHNOLOGY LTD, Jona (CH)

(72) Inventors: Christian Schuldt, Holderbank (CH); Arne Stecher, Holderbank (CH)

(73) Assignee: HOLCIM TECHNOLOGY LTD, Jona (CH)

( * ) Notice: Subject to any disclaimer, the term of this patent is extended or adjusted under 35 U.S.C. 154(b) by 0 days.

(21) Appl. No.: 16/336,360

(22) PCT Filed: Sep. 15, 2017

(86) PCT No.: PCT/IB2017/001123
§ 371 (c)(1),
(2) Date: Mar. 25, 2019

(87) PCT Pub. No.: WO2018/055444
PCT Pub. Date: Mar. 29, 2018

(65) Prior Publication Data
US 2019/0226174 A1     Jul. 25, 2019

(30) Foreign Application Priority Data

Sep. 26, 2016 (AT) .................................. A 440/2016

(51) Int. Cl.
*E02D 27/42* (2006.01)
*F03D 13/20* (2016.01)

(52) U.S. Cl.
CPC ........... *E02D 27/425* (2013.01); *E02D 27/42* (2013.01); *F03D 13/22* (2016.05)

(58) Field of Classification Search
CPC ........ E02D 27/425; E02D 27/42; F03D 13/22

USPC ..... 52/292, 294–299, 651.01, 651.02, 169.9, 52/169.13, 836, 848, 843
See application file for complete search history.

(56) References Cited

U.S. PATENT DOCUMENTS

| | | | |
|---|---|---|---|
| 8,359,798 B2 * | 1/2013 | Armbrecht | E02D 27/425 52/297 |
| 8,661,752 B2 * | 3/2014 | Phuly | E02D 27/42 52/296 |
| 8,695,297 B2 * | 4/2014 | Knisel | F03D 13/22 52/223.2 |
| 8,776,463 B2 * | 7/2014 | Kim | F16F 1/40 52/295 |

(Continued)

FOREIGN PATENT DOCUMENTS

DE     69 927 791 T2     7/2006
WO     WO 2004/101898 A2     11/2004

OTHER PUBLICATIONS

International Search Report as issued in International Patent Application No. PCT/IB2017/001123, dated Dec. 11, 2017.

*Primary Examiner* — Brent W Herring
(74) *Attorney, Agent, or Firm* — Pillsbury Winthrop Shaw Pittman LLP

(57) ABSTRACT

A foundation for a windmill, has a circular or polygonal pedestal for supporting a windmill tower, and a plurality of ribs which project radially outwards from the pedestal, wherein the pedestal is divided in the vertical direction into a base ring section and an adapter ring section, the base ring section being divided into a plurality of peripheral sections and composed of precast concrete elements, and the adapter ring section likewise being composed of precast concrete elements.

27 Claims, 7 Drawing Sheets

(56) References Cited

U.S. PATENT DOCUMENTS

Figure 1:
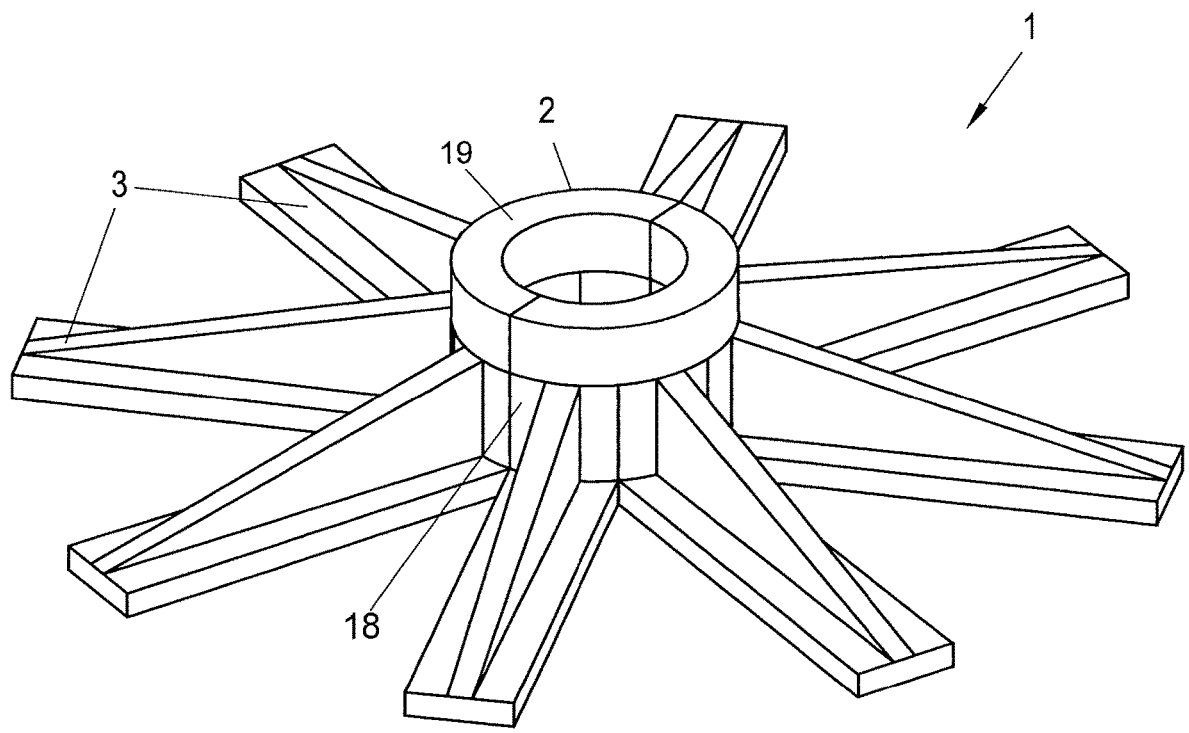

| | | | | |
|---|---|---|---|---|
| 8,833,004 B2* | 9/2014 | Prass | ................... | E02D 27/425 |
| | | | | 52/169.1 |
| 9,096,985 B1 | 8/2015 | Phuly | | |
| 9,347,197 B2* | 5/2016 | Phuly | ................... | F03D 13/22 |
| 9,534,405 B1* | 1/2017 | Phuly | ................... | F03D 13/22 |
| 9,937,635 B2* | 4/2018 | Phuly | ................... | F03D 13/22 |
| 10,024,306 B2* | 7/2018 | Kirkley | ................ | E04H 12/341 |
| 10,309,074 B2* | 6/2019 | Tozer | ................... | E02D 27/016 |
| 2007/0181767 A1* | 8/2007 | Wobben | ................. | E02D 27/42 |
| | | | | 248/346.01 |
| 2011/0061321 A1 | 3/2011 | Phuly | | |
| 2012/0047830 A1* | 3/2012 | Phuly | ................... | E02D 27/42 |
| | | | | 52/294 |
| 2012/0167499 A1* | 7/2012 | Knisel | ................. | F03D 13/22 |
| | | | | 52/231 |
| 2013/0326970 A1* | 12/2013 | Prass | ................... | E02D 27/42 |
| | | | | 52/169.1 |
| 2014/0290161 A1* | 10/2014 | Zavitz | ................... | E04H 12/16 |
| | | | | 52/223.14 |
| 2015/0052841 A1* | 2/2015 | Kirkley | ................ | E04H 12/342 |
| | | | | 52/578 |
| 2015/0225918 A1* | 8/2015 | Phuly | ................... | B28B 1/14 |
| | | | | 52/297 |
| 2015/0376859 A1* | 12/2015 | Phuly | ................... | F03D 13/22 |
| | | | | 52/223.1 |
| 2016/0108600 A1* | 4/2016 | Menzel | ................. | E02D 27/42 |
| | | | | 52/223.13 |
| 2016/0376763 A1* | 12/2016 | Phuly | ................... | F03D 13/22 |
| | | | | 52/741.15 |
| 2017/0152641 A1* | 6/2017 | Serna Garc A-Conde | ................... | |
| | | | | E04H 12/2269 |
| 2017/0183840 A1* | 6/2017 | Tozer | ................... | E02D 27/016 |
| 2017/0306583 A1* | 10/2017 | Phuly | ................... | F03D 13/22 |
| 2017/0350372 A1* | 12/2017 | Kirkley | ................ | E04C 5/08 |
| 2019/0119875 A1* | 4/2019 | Corella | ................ | E02D 27/425 |
| 2019/0263020 A1* | 8/2019 | Phuly | ................... | F03D 13/22 |

\* cited by examiner

FOUNDATION FOR A WINDMILL

CROSS-REFERENCE TO RELATED APPLICATIONS

This application is the U.S. National Stage of International Application Serial No. PCT/IB2017/001123, filed Sep. 15, 2017, which in turn claims priority to Austrian Application No. A 440/2016, filed Sep. 26, 2016. The contents of all of these applications are incorporated herein by reference in their entirety.

The invention relates to a foundation for a windmill, having a circular or polygonal pedestal for supporting a windmill tower and a plurality of ribs which project radially outwards from the pedestal.

The invention further relates to a wind turbine having a windmill tower including a rotor, with the windmill tower being mounted on a foundation.

A windmill foundation of the afore mentioned type is disclosed in WO 2004/101898 A2. As described therein, the manual and administrative effort for producing the foundation of onshore wind energy installations is high, and production is very time-consuming. Given the increasing size of modern wind turbines, the foundation is subjected to very high loads and has to be dimensioned accordingly. Modern wind turbines have towers with heights up to 150 m and generate up to 6 MW. In most cases, the tower or mast of wind turbines consists of reinforced concrete and is constructed using precast concrete elements. The windmill tower can alternatively also be formed by a steel structure.

To date, the foundations for wind energy installations have essentially been produced by excavating a foundation pit, placing a granular substructure, erecting a foundation element, carrying out the necessary formwork and reinforcement work and subsequently filling the foundation pit with in-situ concrete, with the concrete being transported to the work site as ready-mix concrete by transit mixer trucks and poured into the foundation pit. The central foundation element typically has a hollow cylindrical configuration, and is usually precast and transported to the respective assembly site as a single unit. The production of a windmill foundation using in-situ concrete is associated with a number of disadvantages. The logistics required for planning the production activities at the construction site are complex, and the operations at the construction site associated with the erection of the formwork and the reinforcing structure, as well as transporting and pouring the concrete, are time-consuming and expensive. This especially holds true in view of the fact that up to 1000 m$^3$ of concrete can be required for large foundations.

In order to improve the process of building a foundation, WO 2004/101898 A2 already proposed the use of precast concrete elements to build the foundation. Such concrete elements are produced in a prefabrication facility and transported to the work site, where they are moved into position using a crane and then connected to one another. The time for the building operations at the work site can thus be reduced considerably. When connected to one another, the precast concrete elements form a foundation having a central base and a plurality of ribs that respectively project radially outwards from the base. Each precast concrete element forms one of the ribs and an associated peripheral section of the pedestal. The peripheral sections of the pedestal are connected to one another by means of screwed flanges. As is described in WO 2004/101898 A2, the precast concrete elements can be reinforced with steel. After the foundation has been constructed, the tower or mast of the windmill is erected on the pedestal and fastened to the pedestal by means of anchor bolts.

The use of precast concrete elements allows the elements to be produced in a controlled environment, so that the quality of the hardened concrete can be improved. From a financial perspective, the moulds used in a prefabrication facility can be reused many times before they have to be replaced, so that the per unit costs for the mould and the formwork respectively, are lower than for a production using in-situ concrete, which always requires specially built formwork. The formwork can certainly be used multiple times, but has to be transported from location to location and cleaned accordingly.

Wind turbines are subjected to loads and stresses of a specific type that have to be absorbed by the foundation. The wind itself acts in an unpredictable and variable manner. On the other hand, as the installations grow ever larger, dynamic load components resulting from vibrations and resonances act on the structure. Further, due to the overturning moment that occurs, towers having a height of 100 meters and more also transmit considerable eccentric loads to the foundation. The concrete of the foundation has to withstand a compression that occurs in the compressed zone, and the reinforcing structure of the concrete has to absorb the expansion forces in the opposite part of the foundation, because the tensile strength of the concrete itself is relatively low. Foundations made of precast reinforced concrete elements have the advantage that the performance and the quality of the concrete, as well as the quality of the production, in particular the follow-up and curing process, are higher, so that there is a lower risk of crack formation and a higher resilience to dynamic and static loads.

In general, it is preferable to mount the tower or mast of the windmill directly on the foundation. The securing of the tower to the foundation is not standardised, however, but has to be adapted to the specific circumstances of the respective windmill construction. Therefore, windmills vary in their dimensions and in the design of the tower, in the material of the tower (steel or concrete) and in the manner in which they are secured (e.g. anchor bolts or guying). The foundation consequently has to be matched to the circumstances. For precast concrete part foundations this is insofar disadvantageous, because a standardised series production of such foundations is not possible.

Another disadvantage of foundations composed of precast concrete parts is that the concrete elements have to be transported from the factory to the installation site of the windmill. The general desire to limit the number of precast concrete parts that form the foundation has resulted in large and unwieldy concrete elements, the transport of which presents a particular challenge. Transport with commonly available road transport vehicles, however, requires adherence to maximum transport dimensions that cannot be exceeded by the part to be transported.

The object of the present invention is therefore to provide an improved foundation for a windmill consisting of precast concrete elements, which can be produced as much as possible in series production for a widest possible application range, while at the same time easily allowing an adaptation to the specific circumstances of the respective tower construction.

To solve this object, the invention provides a foundation for a windmill of the type described at the outset, which comprises a circular or polygonal pedestal for supporting a windmill tower and a plurality of ribs that project radially outwards from the pedestal, and which is characterised in that, in vertical direction, the pedestal is divided into a base ring section and an adapter ring section, with the base ring section being divided into a plurality of peripheral sections and composed of precast concrete elements and with the adapter ring section likewise being composed of precast concrete elements.

Since, in vertical direction, the pedestal is divided into a lower base ring section and an upper adapter ring section that are both composed of precast concrete elements, the design of the concrete elements of the base ring section can always be the same without the need to take manufacturer-specific adaptations for the tower region into consideration. A series production of the concrete elements forming the base ring section is consequently enabled. According to the invention, the structural adaptations to the tower region are provided by the adapter ring section. The adapter ring section produces the force-optimal connection between the prefabricated component foundation, namely the base ring section, and the wind energy tower and thus leads to improved standardisation of the prefabricated component foundation.

The design of the adapter ring section can optionally take other functions in addition to the structural adaptations, which are due to the tower, into account. For example, the adapter ring section can have an entrance, such as a door opening, into the tower. The adapter ring section can further be provided with precast attachment points for housing network connection cables and/or a supply system or comprise a precast housing for electrical installations. In the interior of the space delimited by the adapter ring section, the adapter ring section can also have stairs or structural preparations for elevators.

The invention thus provides a modular system for a windmill foundation, including a circular or polygonal pedestal for supporting a windmill tower and a plurality of ribs which project radially outwards from the pedestal, with the base comprising a base ring section which is divided into a plurality of peripheral sections and is composed of prefabricated concrete elements and with the system comprising at least two different embodiments of an adapter ring section, which can be placed onto the base ring section and is composed of precast concrete elements. The at least two designs of the adapter ring section preferably differ from one another in the means for anchoring the windmill tower, in particular in the manner, the number or the geometry of the anchoring means. Preferably, a first embodiment of the adapter ring section includes anchor bolts for anchoring the windmill tower and a second embodiment of the adapter ring section includes rope lead throughs for stressing cables for guying the wind turbine tower.

A further advantage of the embodiment according to the invention results from the fact that the vertical division of the foundation into a base ring section and an adapter ring section leads to a reduction of the component height of the precast concrete elements, so that compliance with a specified maximum transport height of e.g. 4.0 m is enabled.

The base ring section is preferably divided into a plurality of peripheral sections, with a peripheral section of the base ring section and a rib projecting outwards from the peripheral section in each case being integrally formed with one another as a precast concrete element. The precast concrete elements in each case preferably have a ring segment-like inner section, with the ring segment-like inner sections of all the concrete elements forming the base ring section forming a closed ring-shaped structure that encloses an inner hollow space of the foundation when said concrete elements are placed against one another. The precast concrete elements in each case further preferably have a radially outer section that forms the mentioned rib. In the put together or assembled state of the foundation, the ribs of the individual concrete elements are preferably arranged at a distance from one another.

In an alternative embodiment, a peripheral section of the base ring section and a rib projecting outwards from the peripheral section are composed of at least two precast concrete elements which adjoin one another in radial direction. This enables to divide the structure consisting of the peripheral section of the base ring section and the associated rib into at least two radially adjoining sections, each of which is formed by a precast concrete element. The division can generally be made in any desired manner. For example, the peripheral section of the base ring section can be formed by a separate precast concrete element and the rib can be formed by a separate precast concrete element. The rib itself can be composed of at least two precast radially adjoining concrete elements. Likewise conceivable is a design in which the peripheral section of the base ring section and an inner radial partial section of the rib are together formed by one single precast concrete element, and at least one outer radial partial section of the rib is formed by at least one further precast concrete element.

According to a preferred embodiment, the adapter ring section is divided into at least two peripheral sections, with each peripheral section being formed by one precast concrete element. In the assembled state of the foundation, the precast concrete elements of the adapter ring section are positioned on the precast concrete elements of the base ring section.

The adapter ring section and the base ring section preferably have a different circumferential pitch. The dividing planes of the circumferential pitch of the adapter ring section preferably extend vertically. The dividing planes of the circumferential pitch of the adapter ring section are preferably arranged offset to the dividing planes of the circumferential pitch of the base ring section. The peripheral sections of the adapter ring section preferably all have the same circumferential extent. The peripheral sections of the base ring section can likewise all have the same circumferential extent. If the adapter ring section and the base ring section are to have a different circumferential pitch, this can be realised, for example, by having the circumferential extent of the peripheral sections of the adapter ring section differ from the circumferential extent of the peripheral sections of the base ring section. The adapter ring section preferably has a circumferential pitch of 180°.

A reduction in the component height of the precast concrete elements, and therewith a simplification of transport, is achieved according to a preferred further development by the adapter ring section having at least two rings of precast concrete elements arranged one above the other. The rings can respectively be divided into at least two peripheral sections and each peripheral section can be formed by a precast concrete element, whereby the circumferential pitch preferably being offset relative to one another, in particular offset by 90°. A continuous dividing plane, which may weaken the foundation, is thus avoided.

In the assembled state of the foundation, the adapter ring section rests upon the base ring section as already mentioned. The subdivision of the pedestal into a base ring section and an adapter ring section preferably extends along at least one dividing surface that comprises a horizontal plane.

The dividing surface can preferably also form at least one step, which results in a form-fitting connection along a preferably cylindrical surface in radial direction between the adapter ring section and the base ring section. The adapter ring section thus fits into the prefabricated component foundation in the inner circle, so that a cohesive structure is formed.

To facilitate the flow of force from the adapter ring section into the ribs, which usually narrow towards the outside in vertical direction, a further preferred embodiment provides that an outer edge section of the dividing surface is formed by an annular surface which extends obliquely upwards and outwards.

Connecting elements, such as screw connections, are preferably provided for the preferably releasable connection of the adapter ring section to the base ring section. The adapter ring section is preferably connected to the base ring section from above by means of said connecting elements. The connecting means are formed by e.g. screw bolts, which are screwed into preferably vertically extending screw holes. The screw bolts can alternatively be placed in such a way that they pass through through-bores of both the base ring section and the adapter ring section and tension said sections together with screw nuts fitted to the opposite ends.

A further preferred embodiment of the invention provides that the adapter ring section comprises a horizontal standing surface for the windmill tower and anchoring means for anchoring the windmill tower to the pedestal, with the anchoring means preferably including anchor bolts and/or rope lead throughs. The anchor bolts are typically provided for securing a tower constructed as a steel structure. The rope lead throughs are typically provided for securing concrete towers.

The connecting elements for connecting the adapter ring section to the base ring section are preferably arranged radially outside the anchoring means for anchoring the windmill tower to the pedestal. The connecting elements provided for connecting the adapter ring section to the base ring section, in particular screw bolts, can alternatively also be used for anchoring the windmill tower to the pedestal. For this purpose, a preferred embodiment provides that the connecting elements for connecting the adapter ring section to the base ring section are formed by the anchoring means for anchoring the windmill tower to the pedestal.

The precast concrete elements, which form the pedestal, including the adapter ring section and the base ring section, as well as the ribs, preferably consist of reinforced concrete. Reinforced concrete in this context is concrete that comprises reinforcing elements, such as a reinforcement made of reinforcing bars/steel components and/or stressing elements embedded in the concrete, for stressing together or prestressing the concrete elements, as is the case with prestressed concrete.

In contrast to foundations made of in-situ concrete, no monolithic structure is provided for foundations made of precast concrete elements without additional measures, so that technical solutions for securely connecting the precast concrete elements to one another are sought that imitate a monolithic structure. In order to achieve that the foundation according to the invention behaves like a monolithic foundation, to withstand high static and dynamic loads, a preferred embodiment provides that the precast concrete elements of the base ring section and the precast concrete elements of the adapter ring section consist of reinforced concrete, which comprises a first reinforcing structure, in particular reinforcing elements, bars or wires, which are embedded in the precast concrete elements and/or which are configured as stressing elements for stressing the precast concrete elements together, and that a second reinforcing structure is provided, which holds the precast concrete elements together and is coupled to the first reinforcing structure.

The second reinforcing structure can be of any type suitable for rigidly holding the precast concrete elements together to form a monolithic structure. The second reinforcing structure differs from the first reinforcing structure and is therefore preferably not embedded in the precast concrete elements. The second reinforcing structure is coupled to the first reinforcing structure, as a result of which an uninterrupted load path between the reinforcing structures is enabled, so that the forces introduced into the foundation are distributed effectively. In the context of the invention, coupling the first and the second reinforcing structure means that the forces acting on the first reinforcing structure are transmitted to the second reinforcing structure, without the interposition of concrete, and vice versa. The first and the second reinforcing structures can accordingly be connected to one another directly, or via a rigid connecting element other than concrete.

The first reinforcing structure preferably comprises reinforcing bars, which consist of steel or a similar rigid material. The reinforcing bars preferably extend in the longitudinal direction of the ribs. Additional reinforcing bars can extend perpendicular or oblique to the reinforcing bars that extend in the longitudinal direction of the ribs. Additional reinforcing bars/sections can also be arranged in the pedestal and extend in the axial direction of thereof. The elongated reinforcing bars can preferably extend in radial direction to the centre of the foundation, whereby the elongated reinforcing bars can either be arranged in a horizontal plane or extend oblique to the horizontal plane, in particular up towards the pedestal. In the latter case, in terms of the forces that are dissipated radially outwards from the pedestal, the reinforcing bars are essentially aligned with the load path.

The second reinforcing structure preferably comprises a plurality of rigid elongated reinforcing elements, in particular steel sections or bars, which respectively connect the precast concrete elements of a pair of oppositely arranged precast concrete elements in such a way that they traverse a hollow space surrounded by the pedestal. The elongated reinforcing elements of the second reinforcing structure are coupled to the first reinforcing structure, in particular to the reinforcing bars, preferably to the reinforcing bars that extend in the longitudinal direction of the ribs. The reinforcing bars embedded in oppositely arranged precast concrete elements are thus connected to one another by the elongated reinforcing elements of the second reinforcing structure, with a load transmission path being formed within the first reinforcing structure of the oppositely arranged precast concrete elements. The expansion load, which is exerted on the foundation as a result of a bending moment of the tower, is consequently absorbed not only by the first reinforcing structure arranged on one side of the foundation, but is also transmitted to the first reinforcing structure arranged on the opposite side of the foundation.

According to a preferred embodiment of the invention, each pair of oppositely arranged precast concrete elements is connected to one of the rigid elongated reinforcing elements. In this way, a plurality of elongated reinforcing elements, in particular steel bars or sections, traverse the hollow space surrounded by the pedestal. Since these traversing elongated reinforcing elements are all arranged diametrically they meet in the centre of the pedestal, thereby achieving a symmetrical arrangement that ensures an optimum distribution of the forces within the overall foundation.

The elongated reinforcing elements can traverse the pedestal in a horizontal plane. However, it is preferably provided that a pair of oppositely arranged precast concrete elements in each case includes a precast concrete element of the base ring section and a precast concrete element of the adapter ring section.

In this context, it is advantageous if the rigid elongated reinforcing elements are connected to one another at their intersection, which is positioned on the central axis of the pedestal. This provides a centre point in the axis of symmetry of the foundation, which makes load distribution in different directions possible.

With respect to the coupling between the first reinforcing structure and the second reinforcing structure, a preferred embodiment provides that the rigid elongated reinforcing elements of the second reinforcing structure and the first reinforcing structure, in particular the reinforcing bars, are connected to one another by means of a casing arranged on an inner surface of the pedestal. The casing can consist of a steel sheet housing that is mounted on the inner surface of the pedestal. In the case of a pedestal in the form of a hollow cylinder, the casing can be designed as a cylindrical casing arranged on the inner cylindrical surface of the pedestal. The casing serves to direct the load path from the first reinforcing structure to the second reinforcing structure and vice versa. This is achieved by rigidly connecting both the reinforcing bars/sections of the first reinforcing structure and the reinforcing elements of the second reinforcing structure to the casing.

In this context, a preferred embodiment provides that the reinforcing bars of the first reinforcing structure are fastened to the casing by welding or by means of screw connections. This can advantageously be achieved by arranging the reinforcing bars of the first reinforcing structure in such a way that they project inwards from the precast concrete elements and preferably penetrate openings provided in the casing. In this case, the welding can be carried out on the inner side of the casing. The welding can alternatively be carried out on the outer side of the casing.

The second reinforcing structure can also be fastened to the casing by welding or by means of a screw connection.

The second reinforcing structure can alternatively be fastened to connecting pieces, which are integrated, in particular cast, into the precast concrete elements and coupled to the first reinforcing structure, by welding or by means of a screw connection.

The hollow space within the pedestal can be used for a variety of purposes, for example as a storage space or for performing maintenance, and can therefore be equipped with stairs, platforms, etc. The hollow space can furthermore also be used for installing, accessing and servicing restressing cables, with the restressing cables being positioned to stabilise the tower of the windmill.

According to a preferred embodiment, the precast concrete elements comprise a base plate for supporting the rib and are integrally formed with said base plate. The cross section of the precast concrete elements can consequently have the form of an inverted "T", with the horizontal T-bar being formed by the base plate and the vertical T-bar being formed by the rib. However, the rib does not necessarily have to strictly have the form of a vertical bar. The rib can also have a cross section that narrows towards the tip. The cross section of the precast concrete elements can alternatively also have the form of an "I". Starting with the inverted T shape described above, such a form is achieved by an upper horizontal bar that is preferably parallel to the lower horizontal T-bar.

The height of the rib can furthermore preferably increase continuously towards the pedestal. A continuously increasing height of the rib makes it possible to adapt the cross sectional area of the rib to the force propagation, and can be realised, for example, by designing the upper surface or the upper edge of the rib as a ramp that rises towards the pedestal. The rib can alternatively have a curved, i.e. concave, configuration of the upper surface or the upper edge. Either way, the height of the rib can increase towards the pedestal in order to reach the height of the pedestal at the point where the rib transitions into the pedestal.

The reinforcing bars embedded in the rib can preferably extend essentially parallel to the upper edge of the rib, in particular parallel to the rising ramp.

The base plates of the precast concrete elements can have a rectangular shape. Alternatively, the plates can widen in horizontal direction as the distance from the centre of the foundation increases.

To close the hollow space inside the pedestal at the bottom, a preferred embodiment of the invention provides that the base plate comprises an edge section that projects inwards into the hollow space surrounded by the pedestal. In particular, the edge sections of all the precast concrete elements together form a circumferential, in particular circular, edge, which circumferentially supports a central base plate arranged on the base of the pedestal.

According to a further preferred embodiment of the invention, the precast concrete elements are tightened against one another by at least one restressing cable arranged in a circumferential, in particular circular, passage formed in the pedestal. Such cables have the function of an additional reinforcing structure, in contrast to the second reinforcing structure according to the invention, however, the cables are not coupled to the first reinforcing structure embedded in the precast concrete elements.

When the precast concrete elements are tightened against one another, the lateral surfaces of adjacent peripheral sections of the pedestal are pressed against one another. For the precise alignment of the adjacent peripheral sections with one another, the lateral surfaces can have shape fit elements in the form of a tongue and groove arrangement, which interact with one another to ensure the relative position of the elements.

The installation of the precast concrete elements at the work site is simplified considerably, if adjacent precast concrete elements are spaced apart from one another in circumferential direction in their sections that project outwards from the pedestal according to a preferred embodiment. The width dimension of the base plates is in particular such that the base plates of adjacent precast concrete elements do not touch one another. The production tolerances for the production of the precast concrete elements can thus be achieved.

The concrete used for producing the precast concrete elements can be of any type of concrete that is typically also used for pouring concrete at the point of use. In addition to admixtures and water, concrete contains cement as a hydraulic binder.

Fibre-reinforced concrete can also be used to produce the precast concrete elements. The fibres can consist of any fibre material that contributes to increasing the structural integrity, in particular the strength, the impact resistance and/or the durability, of the resulting concrete structure. Fibre-reinforced concrete contains short discrete reinforcing fibres that are uniformly distributed and randomly oriented.

The reinforcing fibres are preferably carbon fibres, synthetic fibres and in particular polypropylene fibres. Alternatively, the reinforcing fibres can be steel fibres, glass fibres or natural fibres.

The invention is described in detail in the following with reference to an embodiment which is shown in the drawing and serves as an example.

Figure 2:
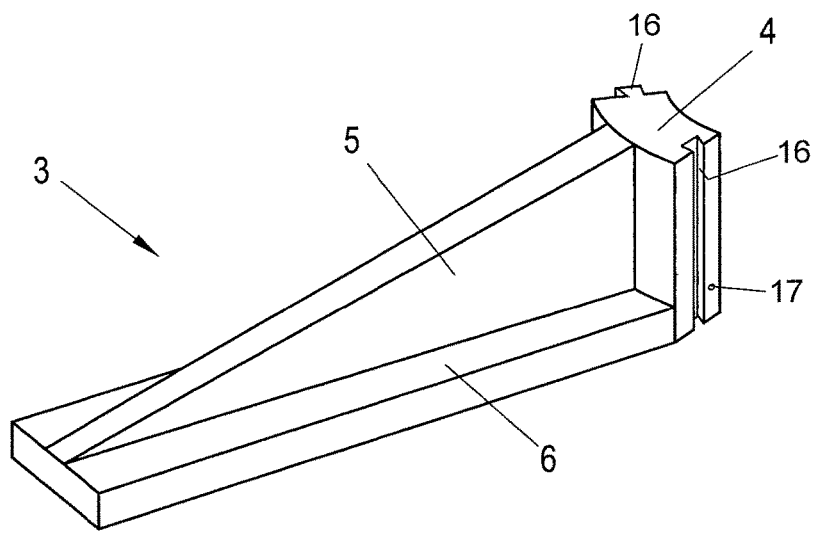
Figure 3:
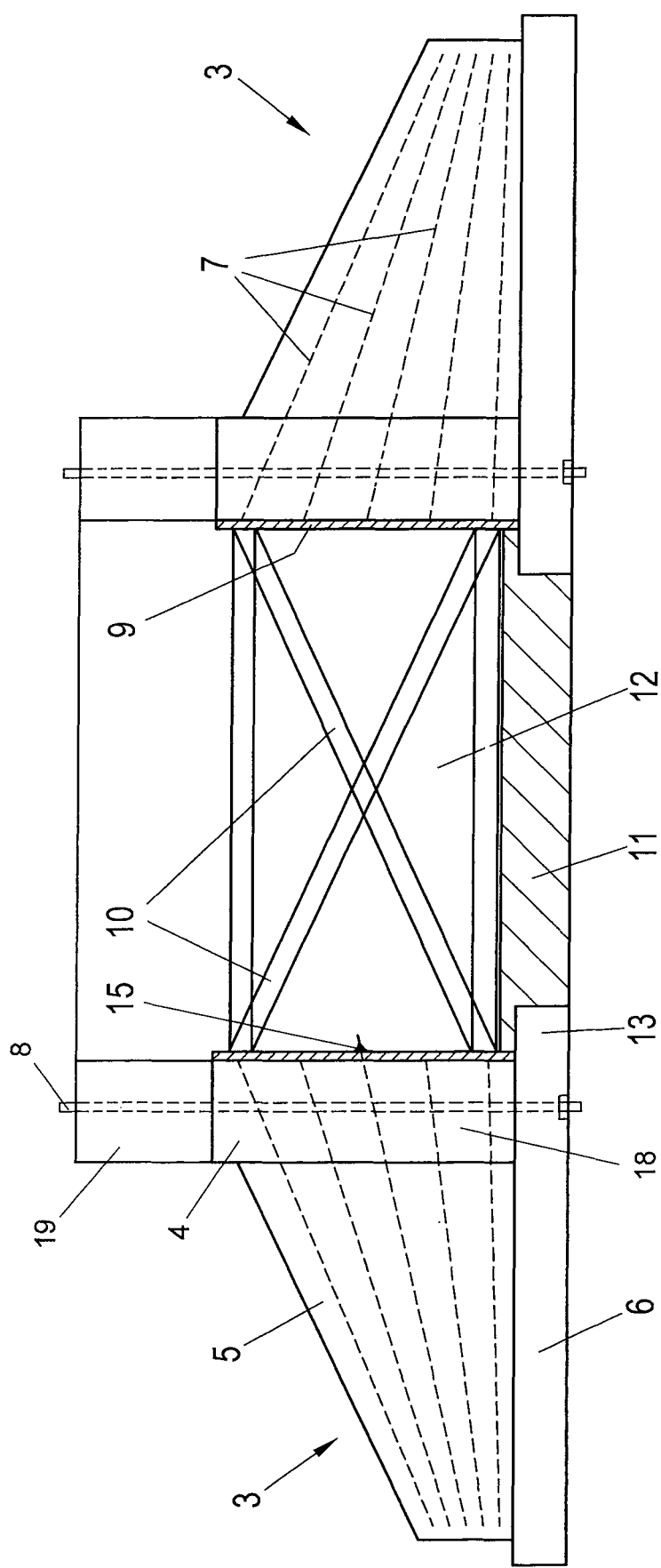
Figure 4:
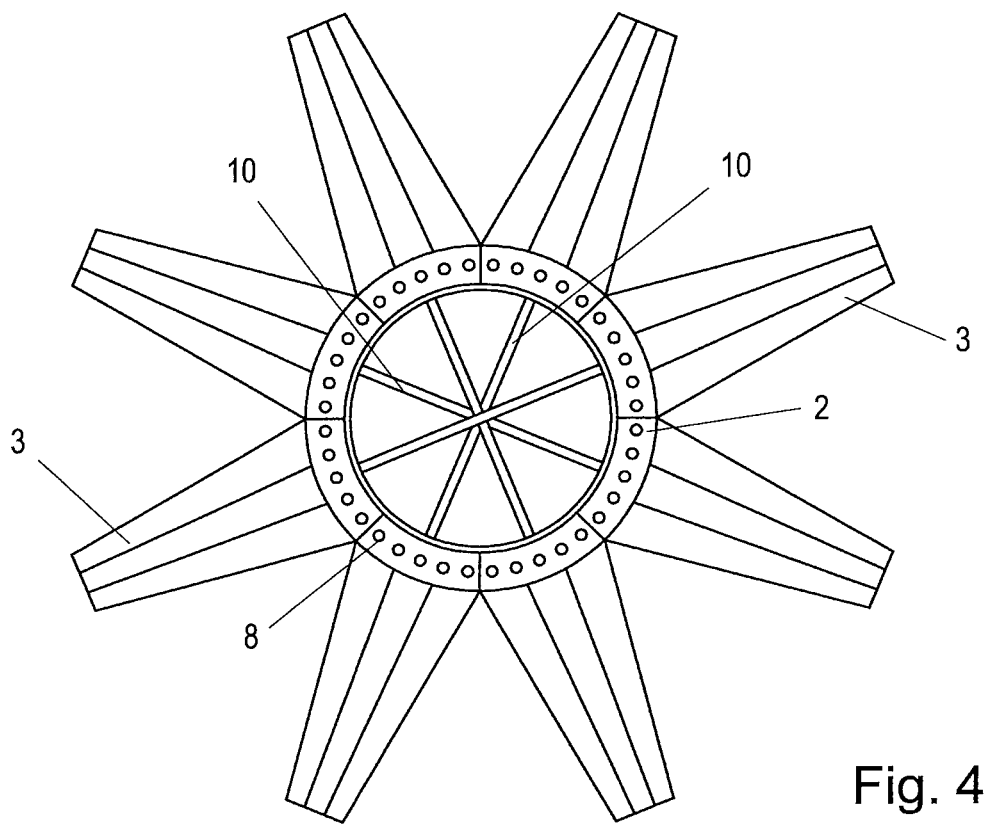
Figure 5:
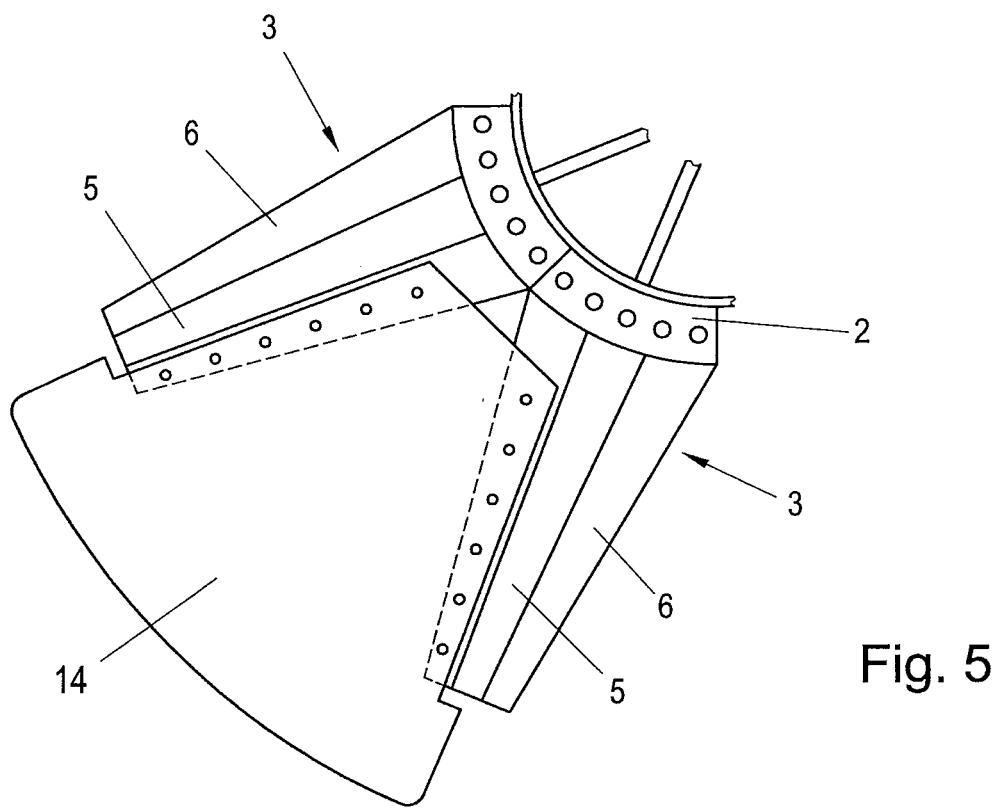
Figure 6:
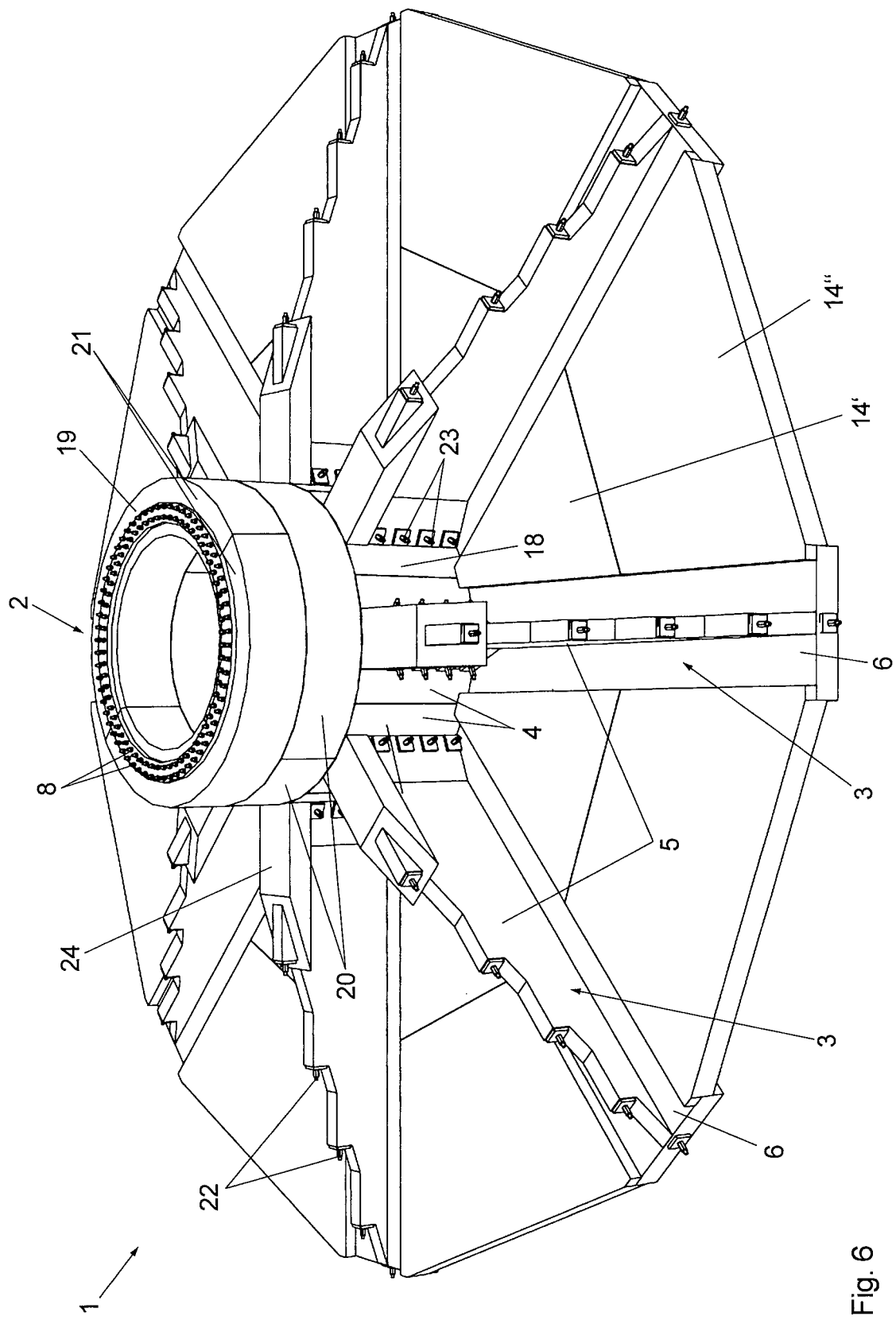
Figure 7A:
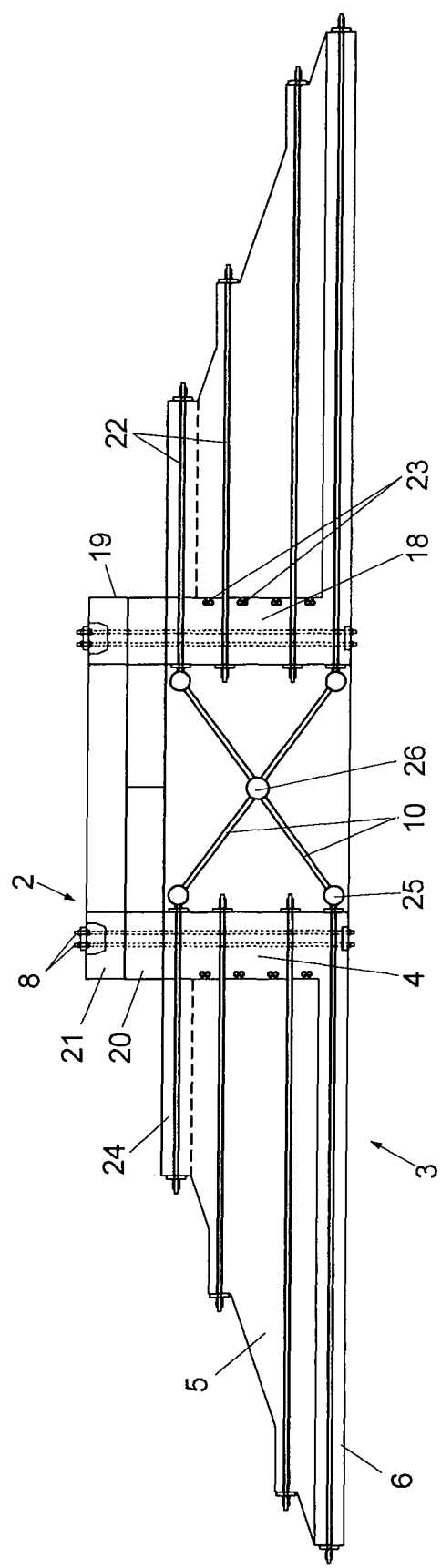
Figure 7B:
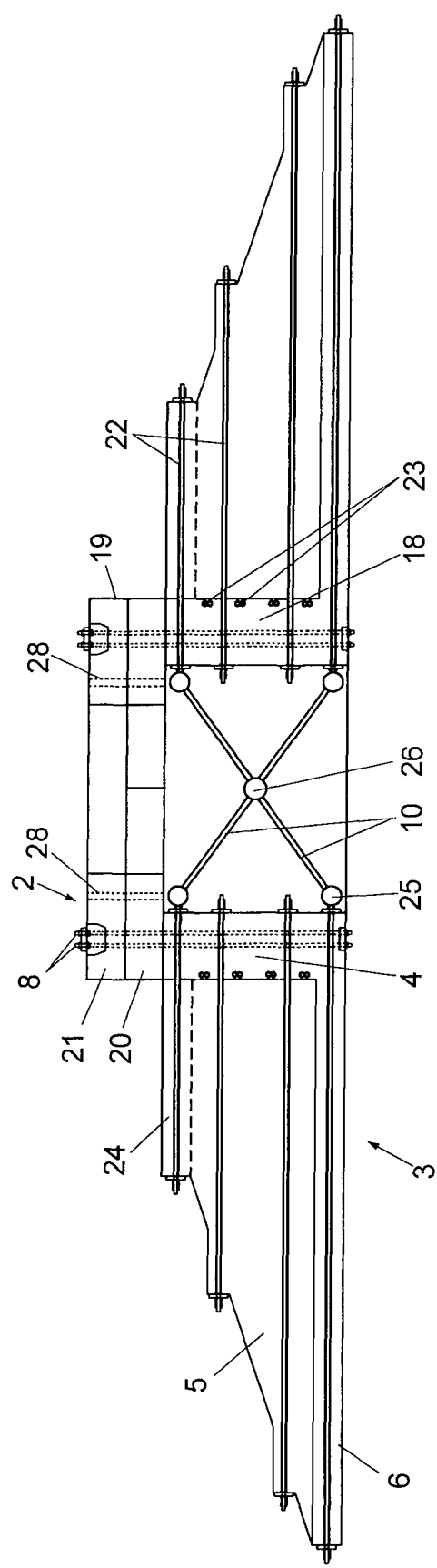
Figure 8:
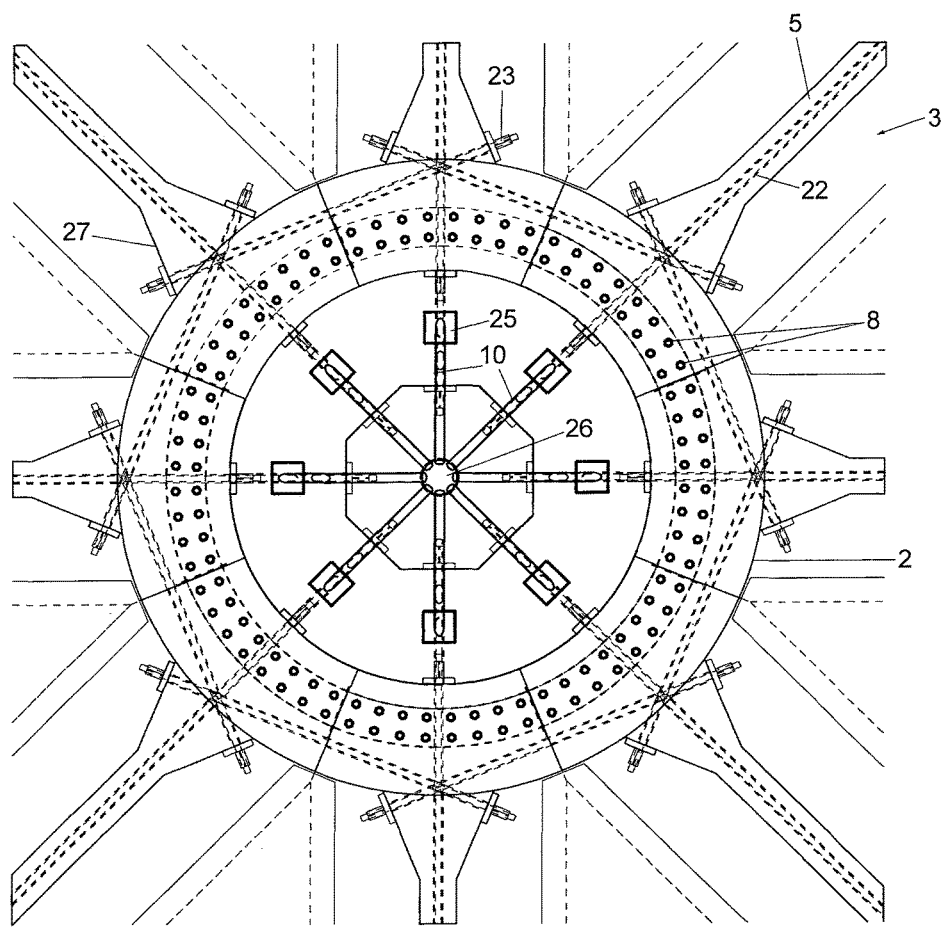

FIG. 1 shows a first embodiment of a windmill foundation consisting of precast concrete elements, FIG. 2 shows a precast concrete element that is used in the foundation of FIG. 1, FIG. 3 shows a cross section of the foundation according to FIG. 1, FIG. 4 shows a plan view of the foundation of FIG. 3, FIG. 5 is a partial plan view of a modified embodiment of the foundation according to FIG. 1, FIG. 6 shows a second embodiment of a windmill foundation, FIG. 7a shows a cross section through the foundation according to FIG. 6, FIG. 7b shows a design modified with respect to FIG. 7a, and FIG. 8 shows a partial view of the foundation according to FIG. 6 in a plan view.

FIG. 1 shows a foundation 1 that has a plurality of precast concrete elements 3. The foundation 1 has a circular pedestal 2 in the form of a hollow cylinder for supporting a windmill tower. The foundation 1 further has a plurality of ribs 5 that project radially outwards from the pedestal 2. The pedestal 2 is divided into a plurality of peripheral sections 4 (FIG. 2), with a peripheral section 4 and a rib 5 in each case being integrally formed with one another as a precast concrete element 3, as shown in FIG. 2. The precast concrete element 3 has a base plate 6 that is likewise integrally formed with the rib 5. The precast concrete elements 3 consist of reinforced concrete with reinforcing bars that are embedded into the precast concrete elements 3.

Even though the ribs in FIG. 2 are shown as a precast concrete element, which consists of a single piece, the ribs can also be composed of two or more rib sections. This is particularly advantageous if a rib is to be realised, which has a radial length that exceeds the permissible length of common transport means. Two or more rib sections can in particular be produced as separate precast concrete elements that are transported to the work site separately and rigidly mounted to one another at the work site.

For the precise alignment of the adjacent peripheral sections 4 with one another, the lateral surfaces can have shape fit elements 16 in the form of a trapezoidal tongue and groove arrangement, which interact with one another to ensure the relative position of the elements 3. The precast concrete elements 3 can furthermore be tightened against one another by means of at least one restressing cable, wherein the at least one restressing cable can be arranged in a circumferential passage, which is in particular circular in cross section and is formed in the pedestal 2, with the opening of the passage being designated with 17. Of course, multiple passages can also be provided.

As can be seen in FIG. 1, the pedestal includes a base ring section 18 and an adapter ring section 19. The base ring section is formed by the peripheral sections 4. The adapter ring section 19 is arranged on the base ring section 18 and consists of two partial segments, which respectively extend around an angle of 180° and are formed by precast concrete elements. On its upper side, the adapter ring section provides a horizontal surface upon which the windmill tower (not depicted) is erected. Anchor bolts 8 are provided for securing the windmill tower (see FIGS. 3 and 4).

The reinforcing bars embedded in the precast concrete elements 3 are shown in FIG. 3 and identified with reference number 7. Also shown are anchor bolts 8, which extend through the peripheral sections 4 of the base ring section 18 and the adapter ring section 19 of the pedestal 2 and are used to secure the tower of the windmill at their free ends, which project from the adapter ring section 19.

A casing 9 is arranged on the inner cylindrical surface of the pedestal 2. The reinforcing bars 7 are configured to project from the precast concrete elements 3 to the inside and penetrate into openings provided in the casing 9, so that the bars 7 can be connected to the casing 9 on the inside by welding (the weld connection at 15 is shown on one of the bars 7 only as an example). Steel sections 10 are additionally respectively connected to the casing 9, for example by means of a screw connection. The steel sections 10 connect oppositely arranged precast concrete elements 3 to one another in such a way that they extend through a hollow space 12 surrounded by the pedestal 2. At least a part of the steel sections 10 extends obliquely in order to form an "X" configuration, wherein the sections 10 are respectively fastened to one of the oppositely arranged precast concrete elements 3 in an upper region and to the other of the oppositely arranged precast concrete elements 3 in a lower region.

As can be seen in FIG. 3, the base plate 6 of each precast concrete element 3 comprises an edge section which projects inwards into the hollow space 12, with the edge sections of all the precast concrete elements 3 together forming a circular edge 13, which circumferentially holds a central lower plate 11 arranged on the bottom of the pedestal 2.

In a plan view of the foundation of FIG. 3, FIG. 4 shows that each pair of oppositely arranged precast concrete elements 3 is connected to one another by steel sections 10.

FIG. 5 shows an embodiment in which the intermediate space between two adjacent precast concrete elements 3 is bridged by a respective bridging plate 14, the radial dimension of which is such that it projects radially from the precast concrete elements 3. The bridging plate 14 can be fastened to the base plate 6 of the precast concrete elements 3 by means of bolts.

A modified embodiment of the foundation 1 is shown in FIGS. 6, 7 and 8. The foundation 1 again includes a plurality of precast concrete elements 3 that in each case form a peripheral section 4 of the base ring section 18 of the pedestal 2, the base plate 6 and the rib 5. The precast concrete elements 3 consist of reinforced concrete with reinforcing bars (not depicted) that are embedded into the precast concrete elements 3. The intermediate space between the precast concrete elements 3 is in each case bridged by bridging plates 14 that, different to the embodiment according to FIGS. 1 to 5, are divided into two parts. An inner bridging plate is identified with 14' and an outer bridging plate is identified with 14".

In vertical direction, the pedestal 2 is divided into a base ring section 18 and an adapter ring section 19. The base ring section 18 is formed by the peripheral sections 4 of the precast concrete elements 3. The adapter ring section 19 comprises two rings of precast concrete elements arranged one above the other, with the lower ring being formed by two segments 20 and the upper ring being formed by two segments 21. The segments 20 and 21 in each case extend around an angle of 180° and are formed by precast concrete elements. The pitch of the rings is offset by 90°.

The reinforcing structure of the foundation 1 can be seen in the sectional view of FIG. 7a. In addition to the reinforcing bars made of steel which are embedded in the precast concrete elements 3 and are not depicted, the reinforcing structure includes the stressing elements 22. The stressing elements 22 respectively extend through a passage formed in the concrete elements 3 and are configured as stressing bars or stressing wires or cables made of steel, the ends of which that project out of the concrete element comprise abutment elements that are stressed against the concrete element 3, so that the stressing elements are under stress. A second reinforcing structure is coupled to the tensioning elements 22, which, as in the embodiment of FIGS. 1 to 5, is formed by steel bars or steel sections 10 and connects the stressing elements 22 of oppositely arranged concrete elements 3 to one another in an X-shape. The coupling of the steel sections 10 to the stressing elements 22 takes place via schematically shown coupling elements 25, to which the stressing elements 22 or steel sections 10 are screwed or welded. The x-shaped configuration of the steel sections 10 is achieved by fastening the steel sections 10 to a central element 26, from which the steel sections 10 extend in a star shape.

In FIGS. 6 and 7a, it can further be seen that the cross section of the precast concrete elements 3 is I-shaped, with the base plate 6 and a cover plate 24 being integrally connected to one another by the web of the rib 5.

In the modified embodiment of FIG. 7b, the anchor bolts 8 are used only to tension the adapter ring section 19 together with the base ring section 18. The adapter ring section 19 is now adapted for securing a concrete tower and therefore comprises a plurality of rope lead throughs 28, which are preferably arranged along a circle. The stressing of the cables (not depicted) coming from the tower and guided through the cable rope lead throughs 28 takes place in the underlying hollow space (cable cellar).

In the illustration of FIG. 8, it can be seen that adjacent precast concrete elements 3 in the region of the peripheral sections 4 of the pedestal 2 are braced against one another by means of tangentially extending stressing elements 23. The stressing elements 23 pass through passages formed in the precast concrete elements 3 and preferably consist of steel. The stressing elements 23 can be formed by stressing bars or stressing cables. In order to provide suitable abutment surfaces, the precast concrete elements respectively comprise obliquely extending transition sections 27, the abutment surfaces of which extend perpendicular to the tangential stressing elements 23 at the transition from the peripheral sections 4 to the ribs 5. A first stressing element 23 engages on each precast concrete element 3, which braces the respective concrete element 3 with the nearest concrete element 3 on the right side, and a second stressing element 23 braces the respective concrete element 3 with the nearest concrete element 3 on the left side.

The invention claimed is:

1. A modular system for producing a windmill foundation having a circular or polygonal pedestal for supporting a windmill tower and a plurality of ribs which project radially outwards from the pedestal, wherein, in vertical direction, the pedestal is divided into a base ring section and an adapter ring section, wherein the base ring section is divided into a plurality of peripheral sections and is composed of precast concrete elements, wherein a peripheral section of the base ring section and a rib projecting outwards from the peripheral section are respectively integrally formed with one another as a precast concrete element, and wherein the system comprises at least two different embodiments of the adapter ring section, which can be placed onto the base ring section and is composed of precast concrete elements, wherein the at least two embodiments of the adapter ring section differ from one another in the system adapted to anchor the windmill tower and wherein a first embodiment of the adapter ring section comprises anchor bolts for anchoring the windmill tower and a second embodiment of the adapter ring section comprises rope lead throughs for stressing cables for guying the wind turbine tower.

2. The modular system according to claim 1, wherein the adapter ring section is divided into at least two peripheral sections and each peripheral section is formed by a precast concrete element.

3. The modular system according to claim 2, wherein the adapter ring section and the base ring section have a different circumferential pitch.

4. The modular system according to claim 1, wherein the adapter ring section comprises at least two rings of precast concrete elements which are arranged one above the other.

5. The modular system according to claim 4, wherein the at least two rings are respectively divided into at least two peripheral sections and each peripheral section is formed by a precast concrete element.

6. The modular system according to claim 5, wherein a circumferential pitch of the at least two rings is offset relative to one another.

7. The modular system according to claim 6, wherein the circumferential pitch is offset by 90°.

8. The modular system according to claim 1, wherein the division of the pedestal into the base ring section and the adapter ring section extends along at least one dividing surface which comprises a horizontal plane.

9. The modular system according to claim 8, wherein the at least one dividing surface forms at least one step.

10. The modular system according to claim 1, wherein connecting elements are provided for releasable connection of the adapter ring section to the base ring section.

11. The modular system according to claim 1, wherein the adapter ring section comprises a horizontal standing surface for the windmill tower and an anchoring system adapted to anchor the windmill tower to the pedestal.

12. The modular system according to claim 11, wherein connecting elements for connecting the adapter ring section to the base ring section are arranged radially outside the anchoring system adapted to anchor the windmill tower to the pedestal.

13. The modular system according to claim 11, wherein connecting elements for connecting the adapter ring section to the base ring section are formed by the anchoring system adapted to anchor the windmill tower to the pedestal.

14. The modular system according to claim 11, wherein the anchoring system comprises anchor bolts and/or rope lead throughs.

15. The modular system according to claim 1, wherein the precast concrete elements of the base ring section and the precast concrete elements of the adapter ring section consist of reinforced concrete comprising a first reinforcing structure and wherein a second reinforcing structure is provided, which holds the precast concrete elements together and is coupled to the first reinforcing structure.

16. The modular system according to claim 15, wherein the second reinforcing structure comprises a plurality of rigid elongated reinforcing elements, which respectively connect the precast concrete elements of a pair of oppositely arranged precast concrete elements such that a hollow space surrounded by the pedestal is traversed.

17. The modular system according to claim 16, wherein each pair of oppositely arranged precast concrete elements is connected to one of the plurality of rigid elongated reinforcing elements.

18. The modular system according to claim 16, wherein a pair of oppositely arranged precast concrete elements respectively comprises a precast concrete element of the base ring section and a precast concrete element of the adapter ring section.

19. The modular system according to claim 16, wherein the plurality of rigid elongated reinforcing elements of the second reinforcing structure and the first reinforcing structure are connected to one another by a casing arranged on an inner surface of the pedestal.

20. The modular system according to claim 19, wherein the reinforcing elements of the first reinforcing structure are fastened to the casing by welding/screw connections.

21. The modular system according to claim 16, wherein the plurality of rigid elongated reinforcing elements are steel sections or bars.

22. The modular system according to claim 15, wherein the first reinforcing structure comprises reinforcing elements, sections, bars or wires, which are embedded in the precast concrete elements and/or which are designed as stressing elements for stressing the precast concrete elements together.

23. The modular system according to claim 1, wherein the precast concrete elements of the base ring section comprise a base plate which is integrally formed with said precast concrete elements for supporting the ribs.

24. The modular system according to claim 23, wherein the base plate comprises an edge section which projects inwards into a hollow space surrounded by the pedestal.

25. The modular system according to claim 1, wherein a height of the rib increases continuously towards the pedestal.

26. The modular system according to claim 1, wherein the at least two embodiments of the adapter ring section differ from one another in the manner, the number or the geometry of the anchoring system.

27. A wind turbine having a windmill tower comprising a rotor, wherein the windmill tower is mounted on the modular system according to claim 1.

* * * * *